(12) United States Patent
Ramalingam et al.

(10) Patent No.: US 9,852,160 B1
(45) Date of Patent: Dec. 26, 2017

(54) OPTIMIZING COMPUTATIONAL DATA SYSTEMS

(71) Applicant: Amazon Technologies, Inc., Seattle, WA (US)

(72) Inventors: Harsha Ramalingam, Kirkland, WA (US); Aaron Fernandes, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 340 days.

(21) Appl. No.: 13/905,738

(22) Filed: May 30, 2013

(51) Int. Cl.
*G06F 17/00* (2006.01)
*G06F 17/30* (2006.01)

(52) U.S. Cl.
CPC .. *G06F 17/30283* (2013.01); *G06F 17/30286* (2013.01)

(58) Field of Classification Search
CPC .... G06F 17/5031; G06F 19/18; G06F 19/322; G06F 17/30289; G06F 15/177; G06F 11/0736; G06F 17/30545
See application file for complete search history.

(56) References Cited

U.S. PATENT DOCUMENTS

| | | | |
|---|---|---|---|
| 8,386,601 B1* | 2/2013 | Sutter et al. | 709/224 |
| 2003/0023500 A1* | 1/2003 | Boies | G06Q 30/06 705/26.41 |
| 2006/0080368 A1* | 4/2006 | Orumchian | G06F 17/30321 |
| 2008/0167973 A1* | 7/2008 | De Marcken | G06F 17/30902 705/5 |
| 2009/0077229 A1* | 3/2009 | Ebbs | G08G 1/207 709/224 |
| 2010/0332513 A1* | 12/2010 | Azar | G06F 17/30469 707/769 |
| 2012/0131139 A1* | 5/2012 | Siripurapu | H04L 65/60 709/217 |
| 2012/0131591 A1* | 5/2012 | Moorthi et al. | 718/104 |

* cited by examiner

*Primary Examiner* — Mohammad S Rostami
*Assistant Examiner* — Courtney Harmon
(74) *Attorney, Agent, or Firm* — Lee & Hayes, PLLC; Charles L. Warner

(57) ABSTRACT

A data computation rate is calculated for use by components in a computational data system. The data computation rate defines the frequency at which a computation, or other types of processing, is performed on or using certain data, such as a data value in a database. The data computation rate might be calculated based upon a current or historical data consumption rate that defines the frequency at which a consumer requests or has requested data, a data update rate that defines the current or historical frequency at which the data that is utilized to generate the processed data is or has been modified, a consumer-specified tolerance, and/or other information. The computed data consumption rate might then be utilized to specify the frequency at which the data should be processed by components in the computational data system.

24 Claims, 8 Drawing Sheets

OPTIMIZING COMPUTATIONAL DATA SYSTEMS

BACKGROUND

In some data-centric computational systems, computations performed on data are invoked at a frequency that is equivalent to the frequency at which updates to the data occur. For example, a "trigger" might be specified that is associated with certain data in a database. When the data in the database is modified in some way, the associated trigger causes certain computations defined with respect to the data to be performed. For instance, a computation or other types of processing might be performed on the data in order to generate one or more new data values from the data. The new data values might then be stored in the database or in another location. Consumers might then request and utilize the newly generated data values.

If the frequency at which the data is updated in the example described above is greater than the frequency at which consumers request the data, then computational resources are being wasted. For example, a computation may be performed in the manner described above each time certain data is updated. The data might, for example, be updated one hundred times per minute and, therefore, the computation on the data is also performed one hundred times per minute. If a consumer only requests the results of the computation only one time per minute, then ninety-nine computations per minute more than necessary are being performed. This excessive performance of the computation may be considered a waste of computational resources.

One way to address the problem described above is to perform the computation on the data in response to receiving a request for the results of the computation. By performing the computation only "on-demand" in this way, the waste of computational resources described above may be minimized or even eliminated. This mechanism, however, might impose significant latency (i.e. the time from when a request for the data is submitted to the time a response to the request is received) on the consumers of the data. This latency might be unacceptable in certain applications.

The disclosure made herein is presented with respect to these and other considerations.

DETAILED DESCRIPTION

Figure 1:
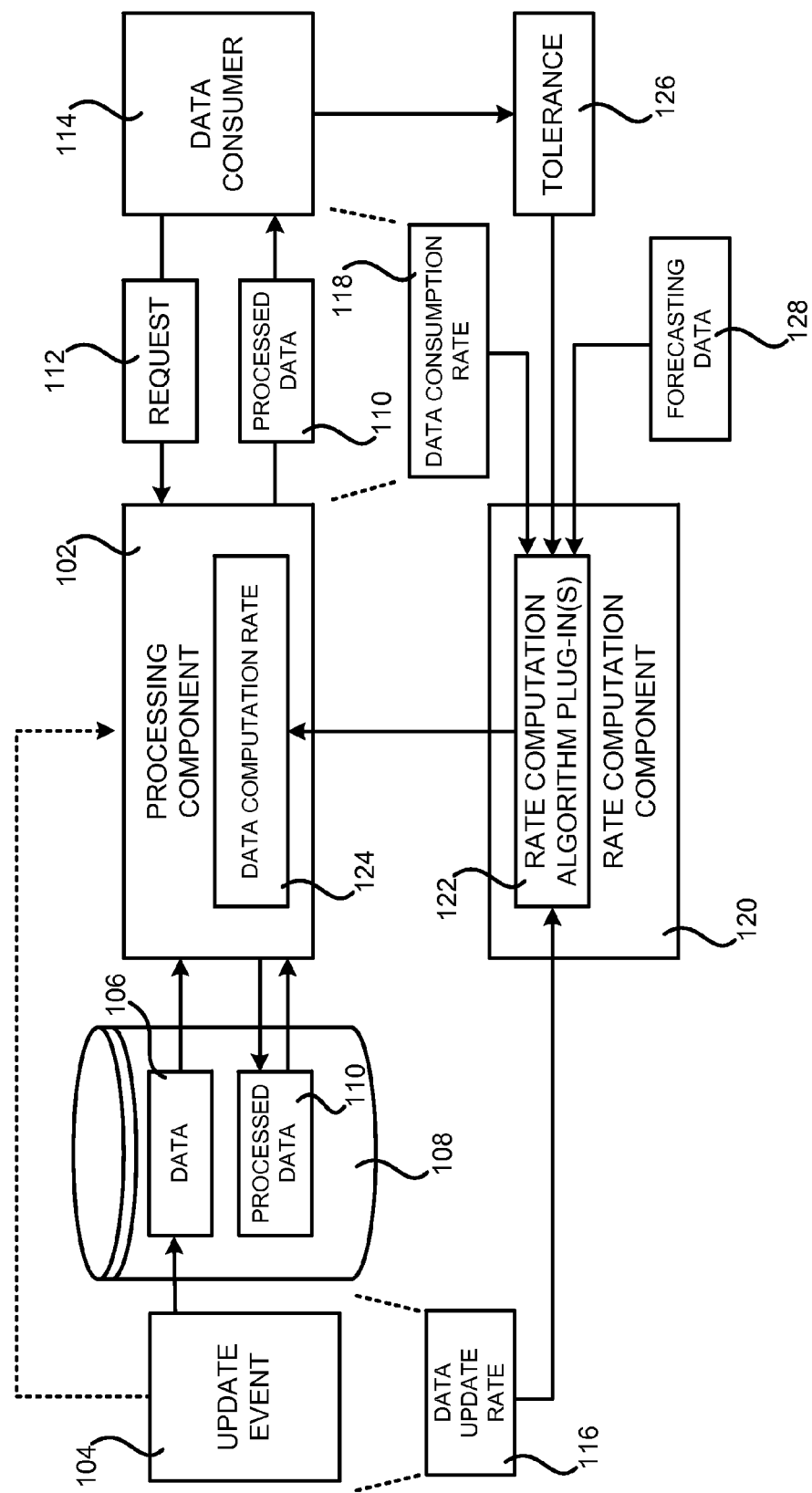
FIG. 1 is a software architecture diagram showing an overview of one illustrative mechanism described herein for optimizing the operation of a computational data system, according to one embodiment disclosed herein.

The following detailed description is directed to technologies for optimizing computational data systems. Utilizing an implementation of the concepts and technologies described herein, a computation can be performed on data at a frequency that is lower than the actual rate of change of the data, while not significantly impacting the consumers of the processed data. For example, if a computation is performed on certain data nine out of ten times that the data is updated, then 10% of the computing resources required to perform the computation have been saved as compared to performing the computation each and every time the data is updated. The likelihood that a consumer will receive stale data has, however, increased. In many scenarios this is acceptable to the consumer of the data. In these scenarios, and potentially others, the various concepts and technologies disclosed herein might be able to save computational resources.

According to one aspect presented herein, a computer-implemented mechanism is disclosed for computing a data computation rate that defines the rate at which a computation is performed on or using certain data, such as a data value in a database. In one implementation, a data consumption rate is determined that defines the frequency at which a consumer, such as a software component executing on a computing device, is requesting the processed data (i.e. the results of the computation). A data update rate is also determined that defines the frequency at which the data that is utilized to generate the processed data is being modified. The data consumption rate and the data update rate may then be utilized to compute a data computation rate that is less than the data update rate and, potentially, less than the data consumption rate. By selecting a data computation rate that is less than the data consumption rate and/or the data update rate, computing resources required to perform the computation may be saved as compared to performing the computation each time the data is updated or requested.

In some implementations, the consumer of the processed data may be permitted to specify a tolerance that defines the frequency at which data that is not current (i.e. "stale data") may be supplied in response to requests from the consumer. The tolerance might also be utilized when computing the data computation rate. For example, a data computation rate might be computed that meets the tolerance specified by the consumer.

Other types of data might also be utilized when computing the data computation rate. For example, historical request data defining the historical frequency of requests for the data might also influence the calculation of the data computation rate. Historical update event data that describes the historical frequency at which the data has been updated might also be utilized to compute the data computation rate. Forecasting data that describes the predicted future data consumption rate might similarly be utilized when computing the data computation rate.

In some implementations, an initial value for the data computation rate is computed utilizing a historical data consumption rate and/or a historical data update rate. The historical data consumption rate describes the rate at which requests for the processed data were previously received during some previous period of time (e.g. the previous hour, week, month, etc.). The historical data update rate describes the rate at which the data utilized to generate the processed data was updated during some previous period of time (e.g. the previous hour, week, month, etc.). In other implementations, an initial value for the data computation rate is calculated utilizing the current rate at which a consumer is requesting the processed data and the current rate at which the data is being updated. In other implementations, both current and historical data regarding the data consumption rate and the data update rate is utilized to calculate an initial value for the data computation rate.

Once an initial value for the data computation rate has been calculated, the data computation rate might be modified based upon the tolerance and a "miss rate" that defines the frequency at which processed data that is not current (i.e. stale) is provided to the consumer. For example, if the miss rate is greater than the consumer-specified tolerance, then the data computation rate might be increased. Similarly, if the miss rate is lower than the consumer-specified tolerance, then the data computation rate might be decreased. This process might be periodically repeated in order to adjust the data computation rate in view of changes to the actual data consumption rate and/or the actual data update rate.

In other embodiments, historical request data that describes requests previously submitted by a consumer is collected. For example, historical request data describing the requests submitted by a consumer in the previous day, month, or year might be collected. Similarly, historical update event data might also be collected. The historical update event data describes updates previously performed to the data utilized to generate the processed data. In this embodiment, one or more analysis models might utilize the historical request data, the historical update event data, and/or the tolerance in order to calculate the data computation rate.

The analysis models might utilize various algorithms, techniques, and/or mechanisms to compute the data computation rate. For example, and without limitation, asynchronous machine learning, simulation, a stochastic process, and/or other types of data analysis models might be utilized to calculate a data computation rate utilizing the historical information described above and other types of data. The analysis models might also utilize other types of data to perform this function. For example, the analysis models might also utilize forecasting data that describes the predicted future data consumption rate.

In some embodiments, multiple algorithms and/or data analysis models might be utilized to simultaneously compute separate data computation rates. An optimal data computation rate might then be selected from the data computation rates computed by each algorithm and/or data analysis model. The optimal data computation rate might be defined as the data computation rate that can be utilized to provide the processed data to the consumer at the lowest operational cost, while still meeting the specified tolerance. Additional details regarding the various components and processes described above for optimizing the operation of a computational data system will be presented below with regard to FIGS. 1-6.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable electronic devices, minicomputers, mainframe computers, handheld computers, personal digital assistants, e-readers, cellular telephone devices, special-purposed hardware devices, network appliances, and the like. The embodiments described herein might also be practiced in distributed computing environments, where tasks may be performed by remote computing devices that are linked through a communications network. In a distributed computing environment, program modules may be located in and executed from both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a software architecture diagram showing an overview of one illustrative mechanism described herein for optimizing the operation of a computational data system, according to one embodiment disclosed herein. As shown in FIG. 1, an illustrative computational data system might include a processing component 102 configured to process data 106 to generate processed data 110. The data 106 might be stored in a data store 108. For example, the data store 108 might be a database, and the data 106 might be a value, or values, stored in the database.

The processing component 102 might perform various types of mathematical, logical, or other types of processing on the data 106 to generate the processed data 110. The processing component 102 might then store the processed data 110 in the data store 108 or in another location. It should be appreciated that the data 106 might be virtually any type of data stored in any type of storage device, system, and/or medium. Additionally, the processing performed by the processing component 102 on the data 106 to generate the processed data 110 might be virtually any type of arithmetic, logical, or other type of processing.

The processing component 102 might also be configured to receive and respond to requests 112 from data consumers 114 (which might be referred to herein simply as "consumers" or a "consumer") for the processed data 110. The consumer 114 might be virtually any type of software and/or hardware component that requires the processed data 110. The consumer 114 might utilize the processed data 110 in various ways.

As shown in FIG. 1, an update event 104 might also occur in response to the data 106 being updated. For example, a program component or other type of system might modify the data 106, thereby generating the update event 104. In some systems, the processing component 102 might be configured to perform its processing on the data 106 to generate the processed data 110 each time an update event 104 occurs.

If the rate at which the data 106 is updated (the data update rate 116) is greater than the rate at which the consumer 114 submits requests 112 for the data 106 (the data consumption rate 118), then computational resources are being wasted. For example, the data 106 might be updated one hundred times per minute and, therefore, the processing component 102 performs its processing on the data 106 to generate the processed data 110 one hundred times per minute. If the consumer 114 requests the processed data 110 only one time per minute, then the processing component 102 is performing ninety-nine computations more per minute than required. This excessive performance of the computation may be an expensive waste of computational resources.

One way to address the problem described above is to configure the processing component 102 to generate the processed data 110 from the data 106 in response to receiving a request 112 for the processed data 110. By processing the data 106 "on-demand" in this way, the waste of computational resources described above may be eliminated. This mechanism, however, might impose significant latency (i.e. the time from when a request 112 is submitted to the time a response with the processed data 110 is received) on the consumer 114. This latency might be unacceptable to the consumer 114 in certain environments and/or applications. The embodiments described below attempt to address these and potentially other considerations.

In order to address the considerations set forth above, a rate computation component 120 is provided in some embodiments. The rate computation component 120 is a software and/or hardware component that is configured to generate a data computation rate 124 for use by the processing component 102. The data computation rate 124 defines the frequency at which the processing component 102 performs its processing on the data 106 to generate the processed data 110.

As will be described in greater detail below, the rate computation component 120 may compute the data computation rate 124 using various mechanisms and methodologies designed to minimize the waste of computational resources described above. For example, and without limitation, the data computation rate 124 might be calculated such that it is lower than the data consumption rate 118 and/or the data update rate 116, while still meeting certain requirements specified by the consumer 114 of the processed data 110. In this way, pre-computed processed data 110 can be provided to the consumer 114, thereby eliminating unwanted latency, while at the same time reducing the cost of unnecessary computations.

In one implementation, the rate computation component 120 utilizes various rate computation algorithm plug-ins 122 ("plug-ins") to compute the data computation rate 124. Each of the plug-ins 122 might implement a different mechanism, methodology, algorithm, and/or data analysis model in order to generate the data computation rate 124 for the processing component 102. Some illustrative mechanisms that might be utilized by the plug-ins 122 to compute the data computation rate 124 are described in greater detail below. The rate computation component 120 might also be configured to compute the data computation rate 124 without using the plug-ins 122 in other embodiments.

In one implementation, the rate computation component 120, or one of the plug-ins 122, determines the data consumption rate 118. As discussed briefly above, the data consumption rate 118 defines the frequency at which the consumer 114 is submitting requests 112 for the processed data 110. The rate computation component 120, or one of the plug-ins 122, might also determine the data update rate 116. As also briefly described above, the data update rate 116 defines the frequency at which the data 106 that is utilized to generate the processed data 110 is being updated or modified. It should be appreciated that the data update rate 116 might follow the Poisson distribution. The Poisson distribution is a discrete probability distribution that expresses the probability of a given number of events occurring in a fixed interval of time and/or space if these events occur with a known average rate and independently of the time since the last event. The data update rate 116 might also follow other distributions.

Once the data consumption rate 118 and the data update rate 116 have been computed, the rate computation component 120, or one of the plug-ins 122, may utilize this information to calculate a data computation rate 124 that is less than the data update rate 116 and, potentially, less than the data consumption rate 118. By computing a data computation rate 124 that is less than the data consumption rate 118 and/or the data update rate 116, computing resources utilized by the processing component 102 to perform the processing on the data 106 may be saved as compared to performing the computation each time the data 106 is updated or requested.

As mentioned briefly above, the consumer 114 of the processed data 110 might be permitted to specify a tolerance 126 in some embodiments that defines the frequency at which processed data 110 that is not current (which may be referred to herein as "stale data") may be supplied in response to requests 112 from the consumer 114. For example, the consumer 114 might specify that it is permissible for the processing component 102 to provide stale data in response to requests 112 some percentage (e.g. 10%) of the time. The tolerance 126 might also be specified in other ways using other metrics.

As will be described in greater detail below, the specified tolerance 126 might also be utilized when calculating the data computation rate 124. For example, the rate computation component 120, or one of the plug-ins 122, might calculate a data computation rate 124 that satisfies the tolerance 126 specified by the consumer 114 of the processed data 110, while at the same time minimizing the cost of the computational resources needed to generate the processed data 110.

In some implementations, other types of data might also be utilized in order to calculate the data computation rate 124. For example, historical request data defining the historical frequency of requests 112 for the processed data 110 might also be utilized to calculate and/or influence the calculation of the data computation rate 124. For example, if the consumer 114 submitted requests 112 at a rate of ten per minute one day, then it might be inferred that the consumer 114 will submit requests at a similar rate on the following day.

Historical update event data that describes the historical frequency at which the data 106 has been updated might also be utilized to calculate and/or influence the calculation of the data computation rate 124. Forecasting data 128 that describes the predicted future data consumption rate might similarly be utilized when calculating the data computation rate 124. Additional details regarding the use of these various types of data to calculate the data computation rate 124 will be described below.

In some implementations, multiple plug-ins 122 might be configured to simultaneously compute data computation rates 124. An optimal data computation rate 124 might then be selected from the data computation rates 124 computed by each plug-in. The optimal data computation rate 124 might be defined as the data computation rate 124 that can be utilized to provide the processed data 110 to the consumer 114 at the lowest operational cost, while still meeting the specified tolerance 126.

It should be appreciated that while only a single consumer 114 has been illustrated in FIG. 1, many such consumers 114 might submit requests 112 to the processing component 102. In the event that two consumers 114 request the same processed data 110, the most restrictive tolerance 126 specified by the consumers may be utilized when calculating the data computation rate 124. In this regard, it should be appreciated that the embodiment shown in FIG. 1 has been simplified for discussion purposes and that many more software and hardware components might be utilized to implement the embodiments disclosed herein. Additional details regarding the calculation of the data computation rate 124 will be provided below with regard to FIGS. 2-6.

Figure 2:
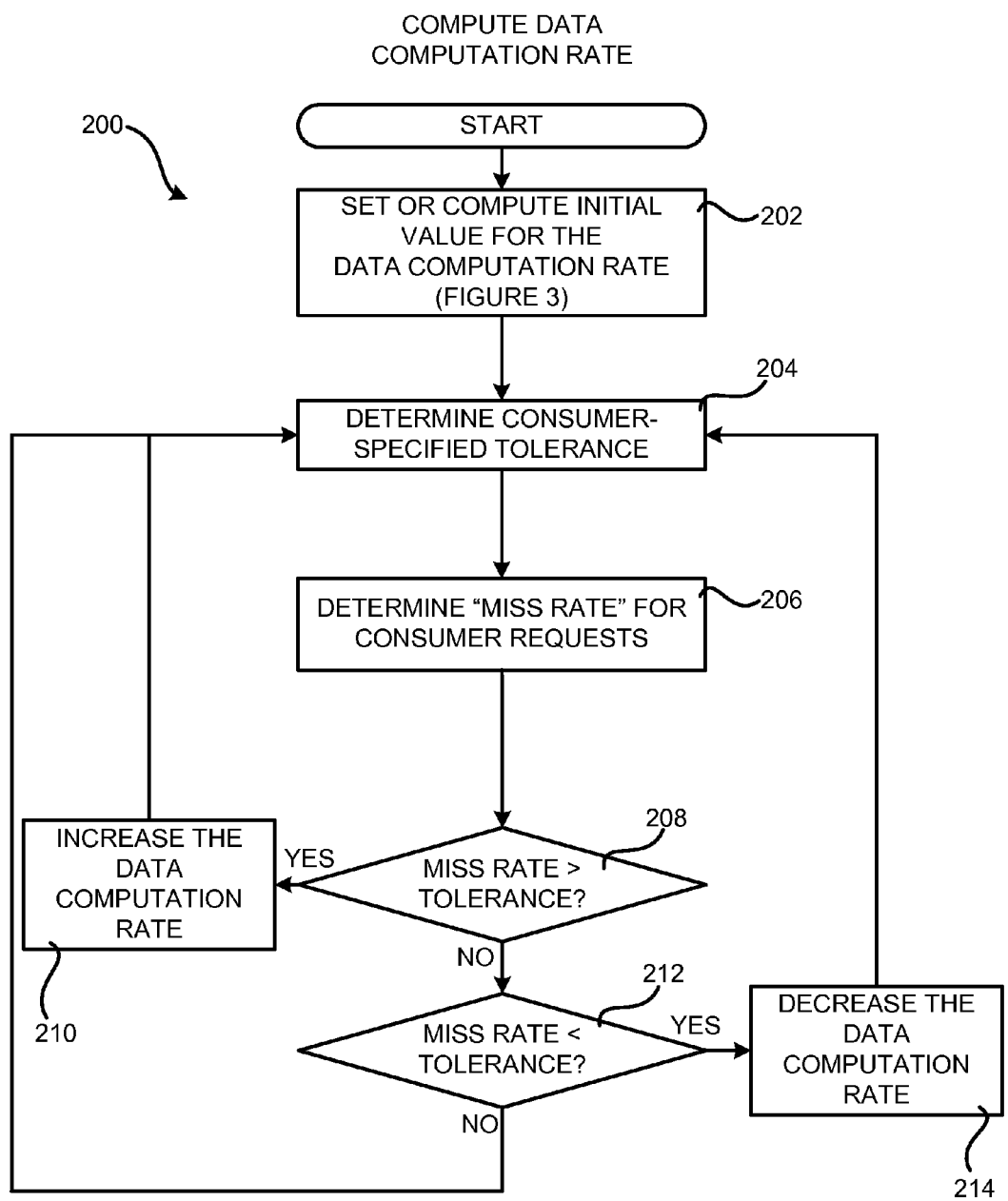
FIG. 2 is a flow diagram showing aspects of the operation of one mechanism disclosed herein for computing an optimal data computation rate for use by a computational data system, according to one embodiment disclosed herein.

FIG. 2 is a flow diagram showing a routine 200 that illustrates aspects of the operation of one mechanism disclosed herein for computing an optimal data computation rate 124 for use by a computational data system such as the one shown in FIG. 1, according to one embodiment disclosed herein. It should be appreciated that the logical operations described herein with respect to FIG. 2, and the other FIGS. might be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where the rate computation component 120, or one of the plug-ins 122, sets or computes an initial value for the data computation rate 124. The initial value for the data computation rate 124 might be set as zero, as some other pre-defined value, or might be computed in various ways utilizing historical and/or other types of data. One illustrative mechanism for computing an initial value for the data computation rate 124 will be described in detail below with regard to FIG. 3.

Once an initial value for the data computation rate 124 has been calculated, the routine 200 proceeds from operation 202 to operation 204. At operation 204, the rate computation component 120, or one of the plug-ins 122, determines the tolerance 126 specified by the consumer 114 of the processed data 110. As mentioned above, the tolerance 126 specifies the frequency at which the consumer 114 is willing to accept stale processed data 110 (i.e. processed data 110 for which an update has been performed but that has not yet been processed by the processing component 102).

From operation 204, the routine 200 proceeds to operation 206, where the rate computation component 120, or one of the plug-ins 122, calculates a "miss rate" for the requests 112 received from the consumer 114. As mentioned briefly above, the "miss rate" defines the frequency at which processed data 110 that is not current (i.e. stale data) is being provided to the consumer 114 in response to requests 112. Once the miss rate has been computed, the routine 200 proceeds from operation 206 to operation 208.

At operation 208, the rate computation component 120, or one of the plug-ins 122, determines if the miss rate is greater than the tolerance 126 specified by the consumer 114. If the miss rate is greater than the tolerance 126, then the routine 200 proceeds from operation 208 to operation 210. At operation 210, the rate computation component 120, or one of the plug-ins 122, increases the data computation rate 124. From operation 210, the routine 200 proceeds back to operation 204, where the process described above may be repeated to continually adjust the data computation rate 124 in view of the current miss rate and the tolerance 126.

If, at operation 208, the rate computation component 120, or one of the plug-ins 122, determines that the miss rate is not greater than the tolerance 208, then the routine 200 proceeds from operation 208 to operation 212. At operation 212, the rate computation component 120, or one of the plug-ins 122, determines if the miss rate is less than the tolerance 126. If the miss rate is less than the tolerance 126, then the routine 200 proceeds from operation 212 to operation 214. At operation 214, the rate computation component 120, or one of the plug-ins 122, decreases the data computation rate 124. The routine 200 then proceeds back to operation 204, where the process described above may be repeated to continually adjust the data computation rate 124 in view of the miss rate and the tolerance 126.

Figure 3:
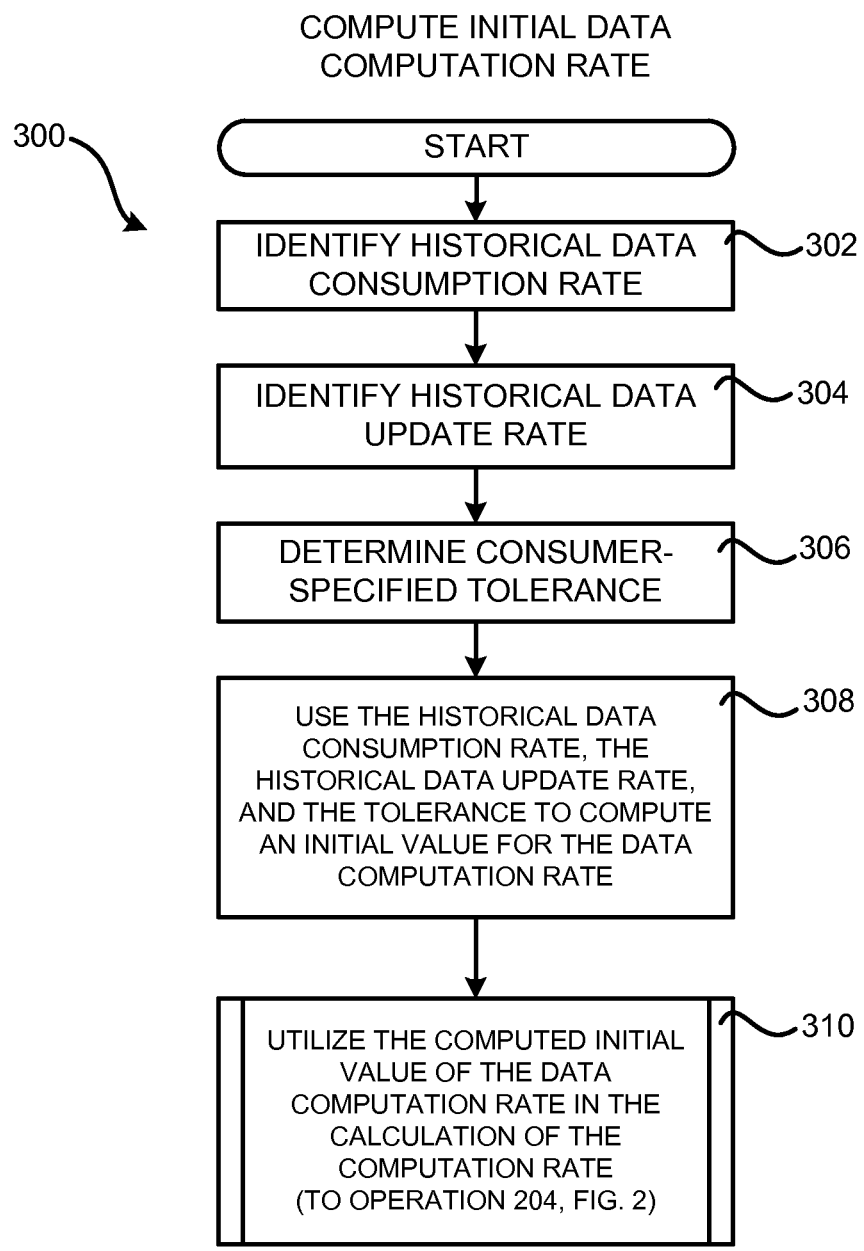
FIG. 3 is a flow diagram showing aspects of the operation of one mechanism disclosed herein for computing an initial value of a data computation rate for use by a computational data system, according to one embodiment disclosed herein.

FIG. 3 is a flow diagram showing a routine 300 that illustrates aspects of the operation of one mechanism disclosed herein for computing an initial value for a data computation rate 124 for use by a computational data system such as that shown in FIG. 1, according to one embodiment disclosed herein. As described above with regard to FIG. 2, the initial value for the data computation rate 124 might be utilized as a baseline, and then be adjusted based upon a current miss rate and the tolerance 126. Various mechanisms might be utilized to compute the initial value for the data computation rate 124. Several of these mechanisms are described below with regard to the routine 300.

The routine 300 begins at operation 302, where the rate computation component 120, or one of the plug-ins 122, identifies or calculates a historical data consumption rate. As discussed briefly above, the historical data consumption rate describes the rate at which requests 112 for the processed data 110 were received from the consumer 114 during some previous period of time (e.g. the previous hour, week, month, etc.).

From operation 302, the routine 300 proceeds to operation 304, where the rate computation component 120, or one of the plug-ins 122, identifies or calculates a historical data update rate. As also discussed briefly above, the historical data update rate describes the rate at which the data 106 utilized to generate the processed data 110 was updated during some previous period of time (e.g. the previous hour, week, month, etc.). From operation 304, the routine 300 proceeds to operation 306, where the rate computation component 120, or one of the plug-ins 122, determines the tolerance 126 specified by the consumer 114.

From operation 306, the routine 300 proceeds to operation 308, where the rate computation component 120, or one of the plug-ins 122, might utilize the historical data consumption rate, the historical data update rate, and/or the tolerance 126 to calculate an initial value for the data computation rate 124. From operation 308, the routine 300 proceeds to operation 310, where the initial value for the data computation rate 124 computed at operation 308 may be utilized by the mechanism described above with regard to FIG. 2 (i.e. at operation 204 of the routine 200).

It should be appreciated that, in other implementations, an initial value for the data computation rate 124 might be calculated utilizing the current rate at which the consumer 114 is submitting requests 112 for the processed data 110 and the current rate at which the data 106 is being updated. In other implementations, both current data and historical data regarding the data consumption rate 118 and the data update rate 116 is utilized to calculate an initial value for the data computation rate 124. Through the use of one of these mechanisms for computing an initial value for the data computation rate 124, the mechanism described above with regard to FIG. 2 might obtain a steady state more quickly than if such mechanisms were not utilized.

In some embodiments, the notion of "seasonality" might also be utilized to influence the selection of historical data for use in the manner described above with regard to FIG. 3. For example, the historical data consumption rate for a particular time period might not be relevant to another time period for various reasons. The data consumption rate 118 might be abnormally low due to a holiday or especially high for some other reason. In these cases, more relevant historical data regarding the data consumption rate 118 and/or the data update rate 116 from another time period might be selected for use in the manner described above. Seasonality includes, but is not limited to, short-term seasonality (e.g. a daily cycle), long-term seasonality (e.g. a monthly or yearly cycle), and events that do not occur on the same date during a particular time period (e.g. holidays that do not fall on the same date each year).

Figure 4:
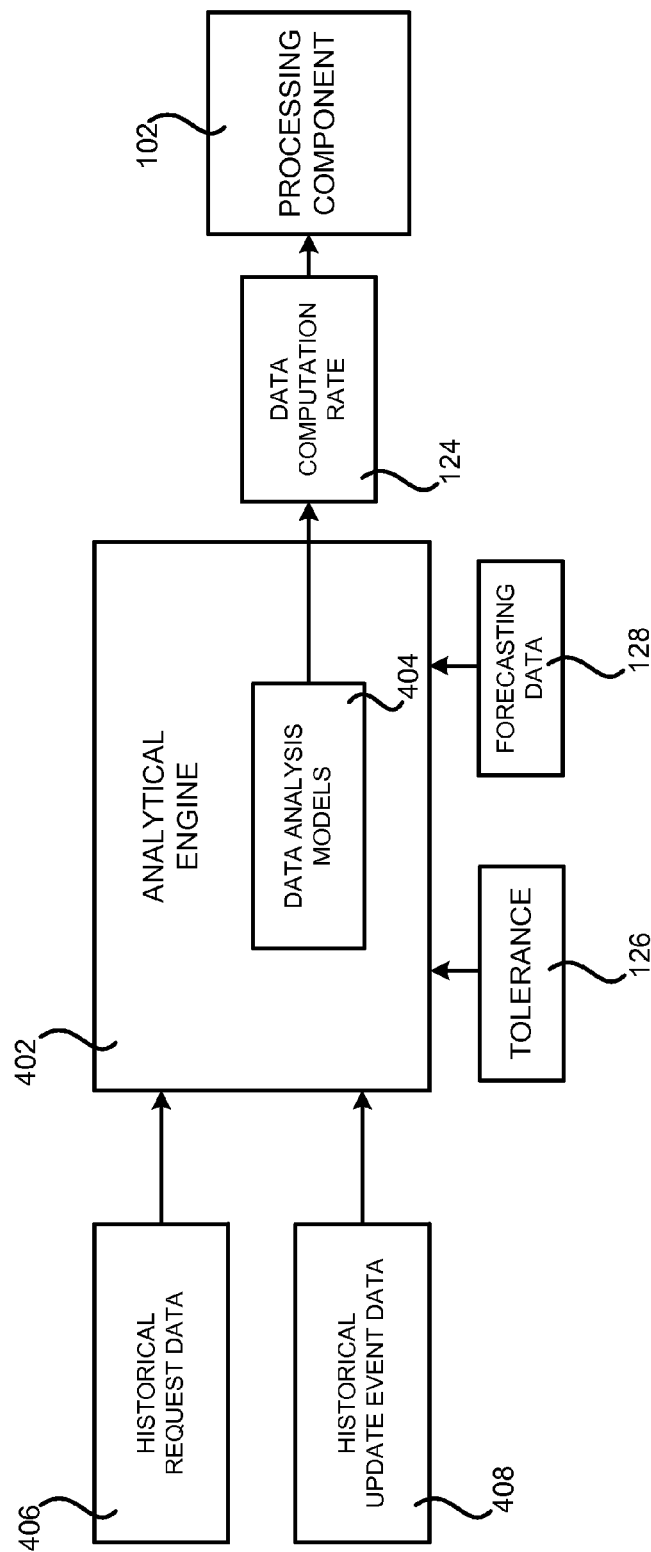
FIG. 4 is a software architecture diagram showing an overview of one illustrative mechanism described herein that utilizes simulation, machine learning, a stochastic process, or another algorithm to compute an optimal data computation rate for use by a computational data system, according to one embodiment disclosed herein.

FIG. 4 is a software architecture diagram showing an overview of one illustrative mechanism described herein that utilizes simulation, machine learning, a stochastic process, and/or another algorithm or data analysis model to compute an optimal data computation rate 124 for use by a computational data system such as the one illustrated in FIG. 1, according to one embodiment disclosed herein. As shown in FIG. 4, an analytical engine 402 might be utilized in embodiments to compute the data computation rate 124 for use by the processing component 102 in processing the data 106. The analytical engine 402 might be implemented as a plug-in 122 to the rate computation component 120, as a standalone component, or in another way.

As shown in FIG. 4, the analytical engine 402 might utilize one or more data analysis models 404 to calculate the data computation rate 124. The data analysis models 404 might utilize various algorithms, techniques, and/or mechanisms to compute the data computation rate 124 for the data 106 for a particular consumer 114. For example, and without limitation, the data analysis models 404 might utilize asynchronous or synchronous machine learning, simulation, a stochastic process, and/or other types of data analysis models in order to calculate a data computation rate 124.

In one implementation, the data analysis models 404 might utilize historical request data 406 to calculate the data computation rate 124. As mentioned briefly above, the historical request data 406 describes requests 112 previously submitted by a consumer 114 during some previous time period. For example, historical request data 406 describing the requests 112 submitted by a consumer 114 in the previous day, month, or year might be collected and utilized by the data analysis models 404.

The data analysis models 404 might also utilize historical update event data 408 to calculate the data computation rate 124. As also mentioned briefly above, the historical update event data 408 describes updates previously performed to the data 106 utilized to generate the processed data 110 during some time period. In this embodiment, one or more analysis models 404 might utilize the historical request data 406, the historical update event data 408, and/or the tolerance 126 in order to calculate the data computation rate 124. As mentioned above, machine learning techniques, simulation techniques, stochastic processes, and/or other techniques might be utilized in order to calculate the data computation rate 124.

In other implementations, the data analysis models 404 might also utilize other types of data in order to calculate the data computation rate 124. For example, the data analysis models might also utilize forecasting data 128 that describes the predicted future data consumption rate 124 and/or the predicted future data update rate 116. The data analysis models 404 might also utilize other information when computing the data computation rate 124 including, but not limited to, the recency of the data, the seasonality of the data, and/or other information. Each type of information might also be assigned a numerical weight that is utilized in the calculation of the data computation rate 124.

In some embodiments, multiple data analysis models 404 might be utilized to simultaneously compute separate data computation rates 124. An optimal data computation rate 124 might then be selected from the data computation rates 124 computed by each data analysis model 404. The optimal data computation rate 124 might be defined as the data computation rate 124 that can be utilized to provide the processed data 110 to the consumer 114 at the lowest operational cost, while still meeting the tolerance 126 specified by the consumer 114.

Figure 5:
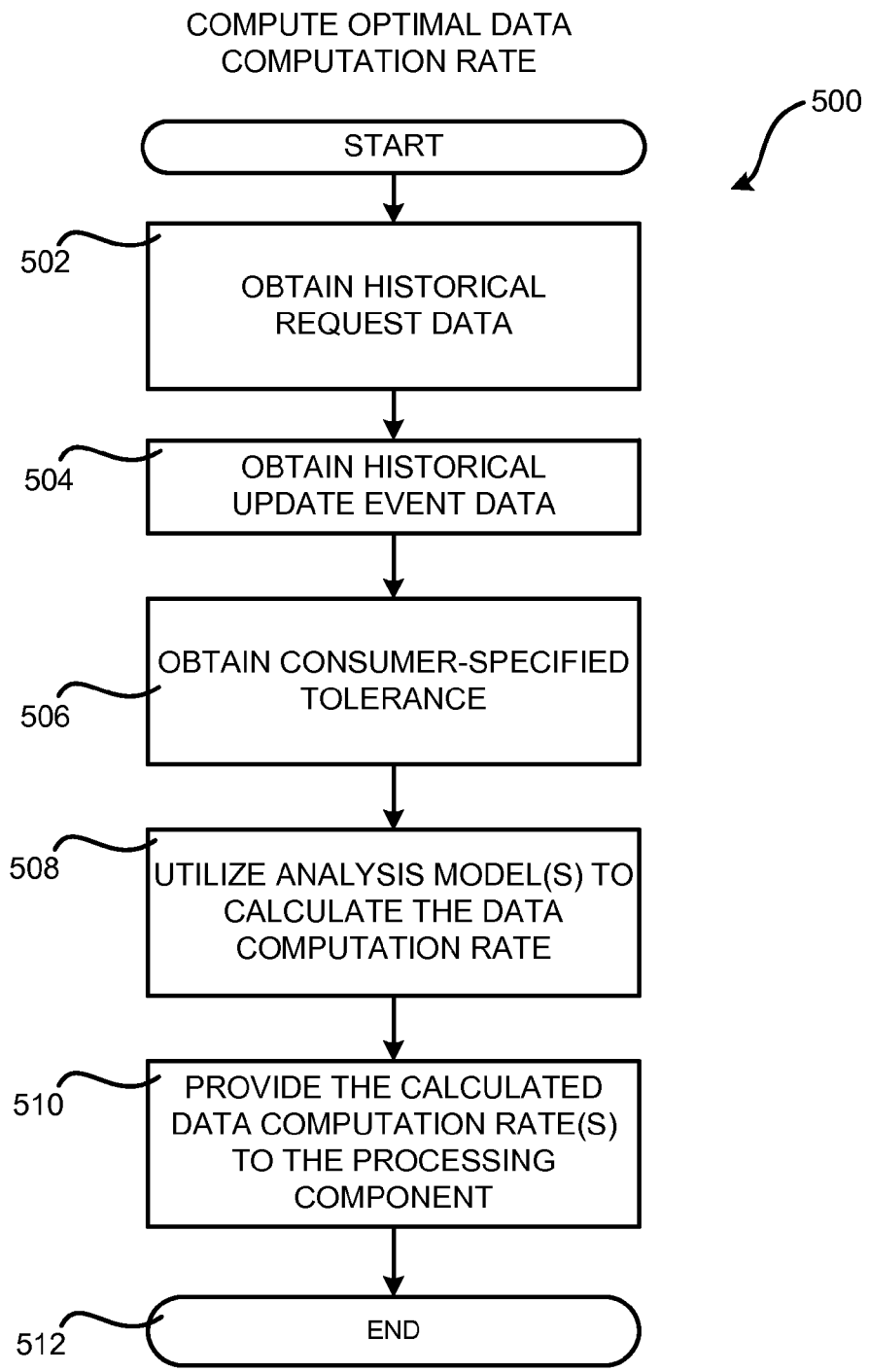
FIG. 5 is a flow diagram showing aspects of the operation of one mechanism disclosed herein that utilizes simulation, machine learning, a stochastic process, or another data analysis model to compute an optimal data computation rate for use by a computational data system, according to one embodiment disclosed herein.

FIG. 5 is a flow diagram showing a routine 500 that illustrates aspects of the operation of one mechanism disclosed herein that utilizes simulation, machine learning, a stochastic process, or another data analysis model 404 to compute an optimal data computation rate 124 for use by a computational data system, according to one embodiment disclosed herein. The routine 500 begins at operation 502, where the analytical engine 402 obtains the historical request data 406. As mentioned above, the historical request data 406 describes requests 112 previously submitted by a consumer 114 during a certain time period. From operation 502, the routine 500 proceeds to operation 504.

At operation 504, the analytical engine 402 obtains the historical update event data 408. As discussed above, the historical update event data 408 describes updates previously performed to the data 106 utilized to generate the processed data 110 during some time period. Once the historical update event data 408 has been collected at operation 504, the routine 500 proceeds to operation 506, where the analytical engine 402 obtains the tolerance 126 and/or any other data that might be utilized to calculate the data computation rate 124, such as the forecasting data 128.

From operation 506, the routine 500 proceeds to operation 508, where one or more of the data analysis models 404 utilizes the historical request data 406, the historical update event data 408, the tolerance 126, and/or other data such as the forecasting data to compute the data computation rate 124. As mentioned above, the data analysis models 404 might utilize various algorithms, technologies, and mechanisms to calculate the data computation rate 124 including, but not limited to, machine learning, simulation, stochastic processes, and others. As mentioned above, multiple data analysis models 404 might be utilized to simultaneously compute a data computation rate 124. The most optimal value (i.e. the rate at which the processing component 102 can provide the processed data 110 to the consumer 114 at the lowest operational cost while still meeting the tolerance 126) might then be selected as the data computation rate 124.

From operation 508, the routine 500 proceeds to operation 510, where the analytical engine 402 provides the calculated data computation rate 124 to the processing component 102 for use in determining when to process the data 106. The routine 500 then proceeds from operation 510 to operation 512, where it ends.

It should be appreciated that, in some embodiments, some or all of the functionality described above might be implemented as a service, such as a Web service. For example, a service might be configured to receive a request for a data computation rate 124 that includes some or all of the data described above, such as the current or historical data consumption rate 118, the current or historical data update rate 116, and/or the tolerance 126. In response to receiving this information, the service might use some or all of this information to compute a data computation rate 124 in the manner described above. The service might then return the computed data computation rate 124 in response to the request. Such a service might also provide other types of functionality not specifically disclosed herein.

It should also be appreciated that although the embodiments disclosed herein have been primarily presented in the context of data stored in a database, the technologies described herein might be utilized in any environment where it would be desirable to determine an optimal rate of pre-processing utilizing various types of inputs, such as the current, historical, or future demand for the results of the pre-processing. For example, and without limitation, these mechanisms might be utilized to determine the manner in which information sites, such as Web sites, should be crawled and indexed for use by a search engine. These mechanisms disclosed herein might also be utilized to determine the manner in which Web content should be archived. These mechanisms might also be utilized to determine when snapshots should be taken of storage volumes or virtual machine instance. These mechanisms might also be utilized in other environments not specifically mentioned herein.

In other embodiments, various mechanisms might also be provided for assisting a consumer 114 in selecting a tolerance 126. For example, the monetary cost of each processing operation performed by the processing component 102 on the data 106 might be determined. The consumer 114 can similarly compute the cost of receiving stale processed data 110 from the processing component 102.

By comparing the cost of computing "fresh" data to the cost of receiving stale data, the consumer 114 might be able to calculate an appropriate tolerance 126. For example, if there is a high cost of stale data for a particular consumer 114, that consumer 114 might choose a low tolerance 126 for stale data even if a low tolerance 126 results in significant operating costs for the processing component 102.

In other implementations, a component might provide functionality for automatically computing the tolerance 126 based upon the cost of receiving stale data to the consumer 114. Other mechanisms might also be provided in other embodiments to assist a consumer 114, or the administrator of such a consumer 114, with the selection of an appropriate tolerance 126.

Figure 6:
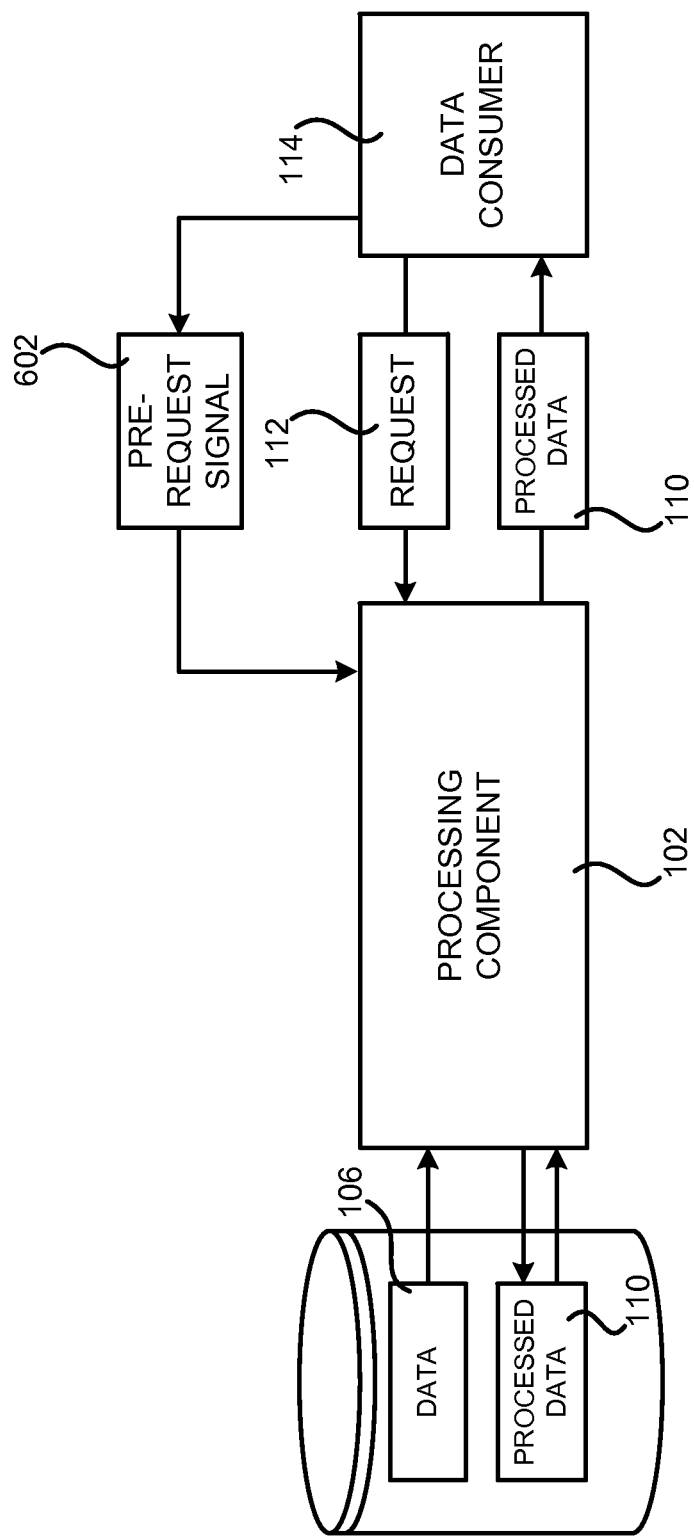
FIG. 6 is a software architecture diagram showing an overview of one mechanism described herein for optimizing the operation of a computational data system that utilizes pre-request signals, according to one embodiment disclosed herein.

FIG. 6 is a software architecture diagram showing an overview of one mechanism described herein for optimizing the operation of a computational data system that utilizes pre-request signals 602, according to one embodiment disclosed herein. As shown in FIG. 6, a data consumer 114 might emit a pre-request signal 602 in some embodiments. The pre-request signal 602 is an advance indication to the processing component 102 that the data consumer 114 will transmit a request 112 for certain processed data 110 at a future point in time. The pre-request signal 602 might identify the particular processed data 110 that will be requested. The pre-request signal 602 might also provide other types of information for use by the processing component 102.

In response to receiving a pre-request signal 602, the processing component 102 is configured to perform pre-processing on the data 106 to generate the processed data 110 that will be requested by the data consumer 114. For example, the processing component 102 might utilize the data 106 to generate the processed data 110 in the manner described above. The processed data 110 might then be stored for use in responding to a future request 112 received from the data consumer 114.

At some time after the pre-request signal 602 is sent, the data consumer 114 might also transmit an actual request 112 for the processed data 110. Because the processing component 102 has already generated the processed data 110, the processed data 110 can be provided to the data consumer 114 with little or no latency. In this way, the data consumer 114 can notify the processing component 102 that a request 112 for processed data 110 is forthcoming, and the processing component 102 can perform the pre-processing required to respond to the actual request 112 for the processed data 110.

Figure 7:
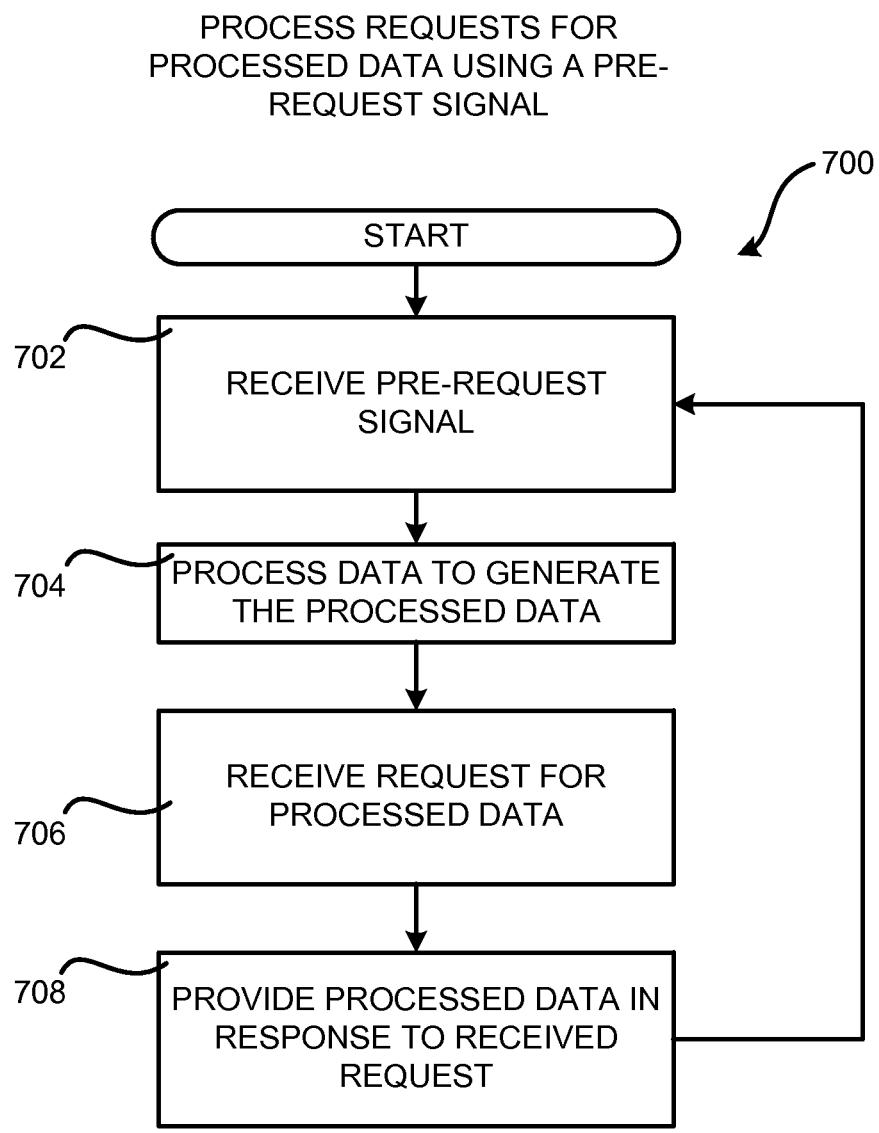
FIG. 7 is a flow diagram showing aspects of the operation of one mechanism disclosed herein for pre-processing data using a pre-request signal, according to one embodiment disclosed herein.

FIG. 7 is a flow diagram showing a routine 700 that illustrates aspects of the operation of one mechanism disclosed herein for pre-processing data 106 using a pre-request signal 602, according to one embodiment disclosed herein. The routine 700 begins at operation 702, where the processing component 102 receives a pre-request signal 602 from a data consumer 114. As discussed above, the pre-request signal 602 is an advance indication to the processing component 102 that the data consumer 114 will transmit a request 112 for certain processed data 110 at a future point in time.

From operation 702, the routine 700 proceeds to operation 704, where the processing component 102 performs pre-processing required for providing the processed data 110 identified in the pre-request signal 602. For example, and without limitation, the processing component 102 might process the data 106 to generate the processed data 110 in the manner described above. The processing component 102 might also perform other types of processing prior to receiving the actual request 112 from the data consumer 114 for the processed data 110.

From operation 704, the routine 700 proceeds to operation 706, where the processing component 102 receives an actual request 112 for the processed data 110 from the data consumer 114. The processing component 102 receives the request 112 some time after the processing component 102 receives the pre-request signal 602 from the data consumer 114.

In response to the processing component 102 receiving the request 112, the routine 700 proceeds to operation 708, where the processing component 102 provides the requested processed data 110 to the data consumer 114 in response to the request 112. The routine 700 then proceeds from operation 708 back to operation 702, where additional pre-request signals 602 and requests 112 might be processed in a similar fashion.

Figure 8:
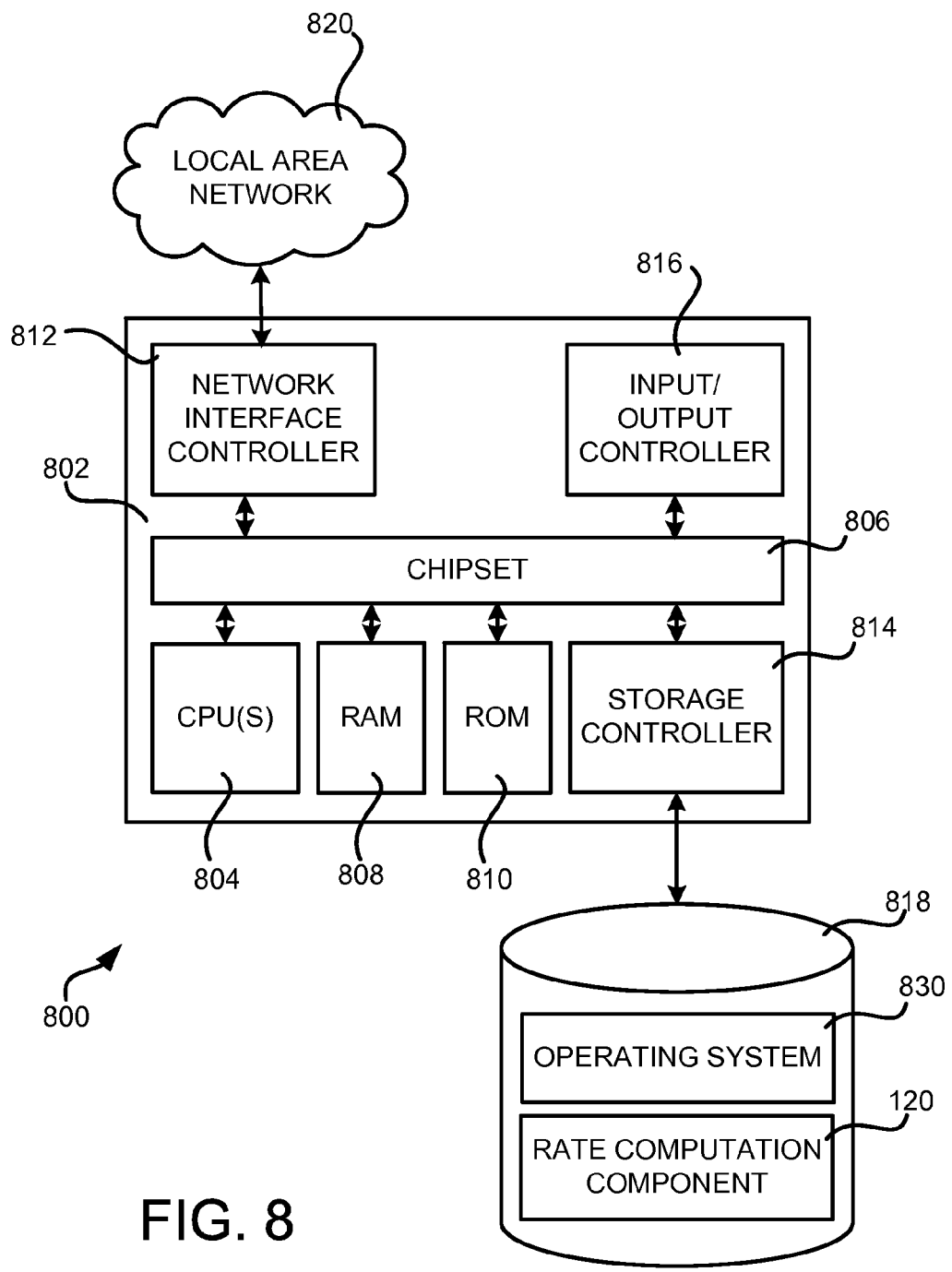
FIG. 8 is a computer architecture diagram showing an illustrative computer hardware architecture for implementing a computing device that might be utilized to implement aspects of the various embodiments presented herein.

FIG. 8 shows an example computer architecture for a computer 800 capable of executing the program components described above for optimizing the operation of a computational data system. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 8 may be utilized to execute the various program components shown in FIGS. 1 and 4 and described above.

The computer 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a random access memory ("RAM") 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the embodiments described herein.

The computer 800 may operate in a networked environment using logical connections to remote computing devices and computer systems through a network, such as the local area network 820. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein.

The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 818 may store other system or application programs and data utilized by the computer 800, such as the rate computation component 120 and/or any of the other software components and data described above. The mass storage device 818 might also store other programs and data not specifically identified herein.

In one embodiment, the mass storage device 818 or other computer-readable storage media is encoded with computer-executable instructions which, when loaded into the computer 800, transforms the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various routines described above with regard to FIGS. 2, 3, and 5. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8. It should also be appreciated that many computers, such as the computer 800, might be utilized in combination to embody aspects of the various technologies disclosed herein.

Based on the foregoing, it should be appreciated that technologies for optimizing the operation of a computational data system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for optimizing a computational data system, the computer-implemented method comprising performing computer-implemented operations for:
    determining at least one of a historical data consumption rate or a historical data update rate, the historical data consumption rate defining a rate at which the consumer has historically requested processed data, the historical data update rate defining a rate at which data has historically been updated;
    determining an initial value for a data computation rate based at least in part on the at least one of the historical data consumption rate or the historical data update rate, the data computation rate comprising a frequency at which a computation is performed on the data to generate the processed data;
    receiving a tolerance associated with a consumer of the processed data, the tolerance specifying a frequency at which processed data that is not current may be provided to the consumer in response to requests from the consumer for processed data;
    computing a miss rate, the miss rate comprising a frequency at which misses occur over a period of time, a miss comprising sending stale data to the consumer in response to receiving a request from the consumer for processed data;
    increasing the data computation rate if the miss rate is greater than the tolerance; and
    decreasing the data computation rate if the miss rate is less than the tolerance.

2. The computer-implemented method of claim 1, wherein the initial value for the data computation rate is based at least in part on both the historical data consumption rate and the historical data update rate.

3. The computer-implemented method of claim 1, further comprising:
    determining a current data consumption rate, the current consumption rate defining a rate at which the consumer is currently requesting the processed data;
    determining a current data update rate, the current data update rate defining a rate at which the data is currently being updated; and
    utilizing the current data consumption rate, the current data update rate, and the tolerance to compute the initial value for the data computation rate.

4. The computer-implemented method of claim 1, further comprising:
    identifying a historical data consumption rate, the historical data consumption rate defining a rate at which the consumer has historically requested the processed data;
    determining a current data consumption rate, the current data consumption rate defining a rate at which the consumer is currently requesting the data;
    identifying a historical data update rate, the historical data update rate defining a rate at which the data has historically been updated;
    determining a current data update rate, current data update rate defining a rate at which the data is currently being updated; and
    utilizing the historical data consumption rate, the current data consumption rate, the historical data update rate, the current update rate, and the tolerance to compute the initial value for the data computation rate.

5. The computer-implemented method of claim 1, further comprising performing the computation on the data to generate the processed data at a frequency equivalent to the data computation rate.

6. The computer-implemented method of claim 1, further comprising repeating operations of computing the miss rate, increasing the data computation rate if the miss rate is greater than the tolerance, and decreasing the data computation rate if the miss rate is less than the tolerance.

7. A computer-implemented method for optimizing a computational data system, the computer-implemented method comprising performing computer-implemented operations for:
  obtaining historical request data, the historical request data defining requests previously submitted by a consumer of processed data, the processed data generated by processing unprocessed data;
  obtaining historical update event data, the historical update event data defining updates previously performed to the unprocessed data utilized to generate the processed data;
  receiving, from the consumer of the processed data, a tolerance associated with the consumer of the processed data, the tolerance specifying a frequency at which processed data that is stale may be provided to the consumer in response to requests from the consumer; and
  utilizing the historical request data, the historical update event data, and the tolerance to modify a data computation rate, the data computation rate comprising the rate at which a computation is performed on the unprocessed data to generate the processed data.

8. The computer-implemented method of claim 7, further comprising performing the computation on the unprocessed data to generate the processed data at a frequency equivalent to the computed data computation rate.

9. The computer-implemented method of claim 7, further comprising utilizing a plurality of data analysis models to compute an optimal rate for the data computation rate from the historical request data, the historical update event data, and the tolerance.

10. The computer-implemented method of claim 9, wherein at least one of the data analysis models utilizes asynchronous machine learning to compute the data computation rate.

11. The computer-implemented method of claim 9, wherein at least one of the data analysis models utilizes simulation to compute the data computation rate.

12. The computer-implemented method of claim 9, wherein at least one of the data analysis models utilizes a stochastic process to compute the data computation rate.

13. The computer-implemented method of claim 9, wherein at least one of the data analysis models utilizes forecasting data to compute the data computation rate, the forecasting data based on a predicted future data consumption rate.

14. The computer-implemented method of claim 9, wherein each of the plurality of data analysis models is configured to compute a data computation rate, and wherein the method further comprises selecting an optimal data computation rate from the data computation rates computed by the plurality of data analysis models.

15. The computer-implemented method of claim 9, wherein the optimal data computation rate comprises a data computation rate that can be utilized to provide the processed data to the consumer at a lowest operational cost while meeting the tolerance.

16. A system for optimizing a data computation rate, the system comprising one or more computer systems configured to:
  determine a data update rate using historical update event data, the data update rate comprising a frequency at which unprocessed data is collected;
  determine a data consumption rate using historical request data, the data consumption rate comprising a frequency at which a consumer is requesting processed data; and
  utilize the data update rate, the data consumption rate, and a tolerance specified by the consumer to modify a data computation rate, the data computation rate comprising a frequency at which the unprocessed data is processed to generate the processed data, the data computation rate being less than the data update rate, the tolerance specifying a frequency at which processed data that is stale may be provided to the consumer in response to requests from the consumer for the processed data.

17. The system of claim 16, wherein the data computation rate is further computed using forecasting data, the forecasting data based on a predicted future data consumption rate.

18. The system of claim 16, wherein the one or more computer systems are further configured to:
  compute a miss rate, the miss rate comprising a frequency at which processed data that is stale is provided to the consumer in response to requests from the consumer for the processed data; and
  modify the computation rate based upon the miss rate and the tolerance.

19. The system of claim 16, wherein the one or more computer systems are further configured to compute an initial value for the data computation rate using a historical data consumption rate and a historical data update rate.

20. The system of claim 16, wherein the one or more computer systems are further configured to:
  utilize a plurality of data analysis models to calculate a plurality of data computation rates; and
  select an optimal data computation rate from the plurality of data computation rates computed by the plurality of data analysis models.

21. A computer-implemented method for optimizing a computational data system, the computer-implemented method comprising performing computer-implemented operations for:
  receiving a pre-request signal from a data consumer, the pre-request signal identifying data desired by the data consumer, the pre-request signal also being an indication that the data consumer will transmit an actual request for the identified data at a later time;
  generating the data identified in the pre-request signal from the data consumer;
  subsequent to receiving the pre-request signal, receiving the actual request from the data consumer for the identified data; and
  providing the identified data to the data consumer in response to receiving the actual request from the data consumer.

22. The computer-implemented method of claim 21, wherein the identified data is generated from data stored in a database.

23. The computer-implemented method of claim 22, wherein the identified data is also stored in the database.

24. The computer-implemented method of claim 23, wherein the data utilized to generate the identified data is periodically updated in the database.

* * * * *